United States Patent [19]

Nagano et al.

[11] 4,008,843

[45] Feb. 22, 1977

[54] APPARATUS FOR SEALING TUBES

[75] Inventors: Kentaro Nagano; Ichiro Henmi; Masahiro Kiyota, all of Yokohama, Japan

[73] Assignee: Asahi Glass Co., Ltd., Tokyo, Japan

[22] Filed: Apr. 29, 1974

[21] Appl. No.: 465,133

[52] U.S. Cl. .................................. 228/33; 29/613; 228/60; 228/48; 228/49

[51] Int. Cl.² ........................................ B23K 1/12

[58] Field of Search ............. 29/503, 613, 627; 228/38, 48, 33, 60, 232, 257, 256, 49; 164/288, 290, 293, 296, 114, 118; 425/174.4

[56] References Cited

UNITED STATES PATENTS

| 914,459 | 3/1909 | Schwaninger | 164/118 X |
|---|---|---|---|
| 2,046,505 | 7/1936 | Down | 164/118 X |
| 2,292,598 | 8/1942 | Batie | 164/288 |
| 3,200,471 | 8/1965 | Johnson et al. | 29/613 |
| 3,271,844 | 9/1966 | Smith | 29/613 X |
| 3,486,551 | 12/1969 | Inoue | 164/286 |
| 3,775,036 | 11/1973 | Winning | 425/174.4 |
| 3,791,439 | 2/1974 | Chapman | 184/114 X |
| 3,823,764 | 7/1974 | Schmitz | 164/288 |

Primary Examiner—Ronald J. Shore
Assistant Examiner—Gus T. Hampilos
Attorney, Agent, or Firm—Oblon, Fisher, Spivak, McClelland & Maier

[57] ABSTRACT

An apparatus is provided for automatically sealing insulation tubes comprising a turn table intermittently turned through a part of a revolution and having a plurality of tube holders disposed in a circle about its central axis, a friction wheel disposed below the turn table and engaging the tube holders for rotating them about their respective vertical axes, a mechanism for stopping the rotation of a predetermined number of the tube holders at predetermined positions along the path of revolution of the turn table, a device for heating the tubes at predetermined positions along the path of revolution of the turn table and a mechanism for supplying a molten solder to the holders being rotated about their axes at a predetermined position in the revolution of the turn table whereby the molten solder is distributed to the peripheral parts of the tube.

4 Claims, 4 Drawing Figures

FIG. 1
FIG. 2
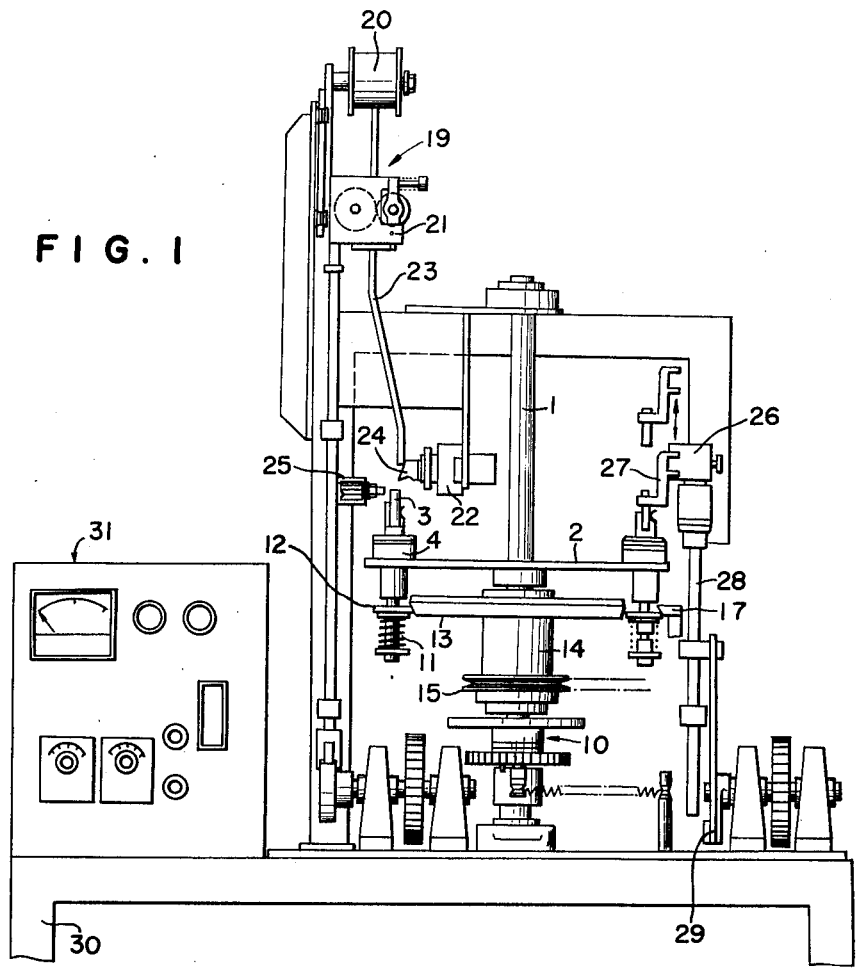
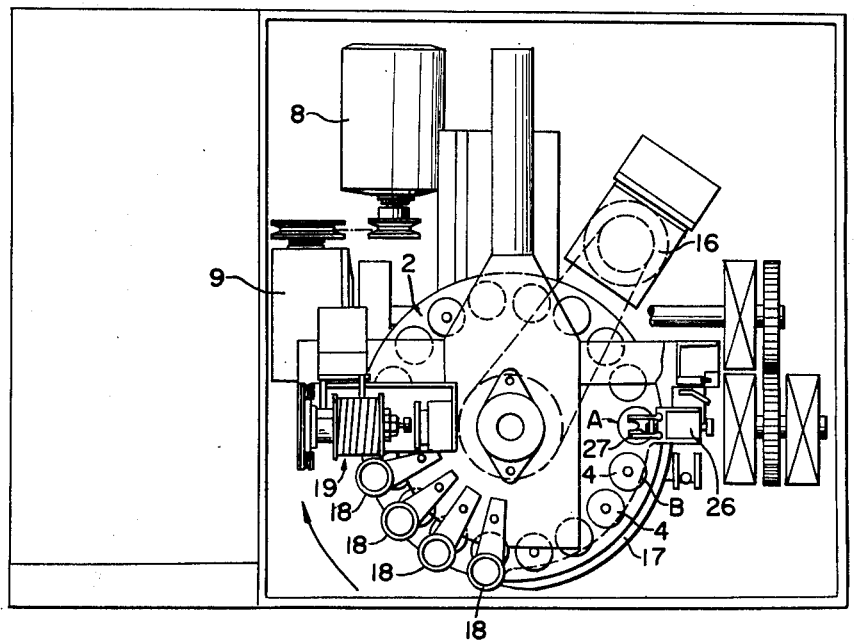

APPARATUS FOR SEALING TUBES

BACKGROUND OF THE INVENTION

1. Field of the Invention:

This invention relates to an apparatus and method of sealing tubes, particularly insulation tubes made of ceramic or glass, in which an electronic or electric device such as a resistor is inserted, under air-tight condition.

2. Description of the Prior Art:

The sealing of insulation tubes made of ceramic or glass in which an electronic or electric device, such as a resistor, being used for an application requiring high insulation and excellent flame and smoke resistance, in inserted under air-tight or vacuum conditions, is a well-known practice. Heretofore, in such air-tight sealing of insulation tubes containing a resistor or the like, a metalized layer, which is usually formed by coating and calcining a silver paste, is placed on the inner surface of both ends of the insulation tube so as to be solderable, and then a solder for sealing is placed on the metalized layer on the inner surface of the insulation tube, and this solder is then heat-melted to cause to be distributed on the sealing part a drench of the solder or an acid or flux. However, it takes a long time to distribute the solder on all of the required area utilizing this method. Accordingly, the metalized layer formed on the insulation tube or on the wall of the resistor is damaged by heat or flux, whereby disadvantages due to incomplete sealing and decrease of desirable characteristics as outlined above are caused.

It has therefore been proposed to seal insulation tubes by forming the metalized layer on an inner surface of the tube, placing the solder on the metalized layer on the inner surface of insulation tube, heat-melting the solder and rotating the insulation tube about its axis, whereby the molten solder can be distributed on the peripheral sides to cause drenching thereof due to a centrifugal force.

However, this process has heretofore been carried out only by hand and, accordingly, there are various disadvantages incurred because it is difficult to supply an optimum amount of solder and to prevent fluctuation of the temperature and the time needed for heat-melting the solder, whereby a loss of the sealed products is high.

SUMMARY OF THE INVENTION

Accordingly, it is an object of the present invention to provide an improved method of sealing electronic or electric devices in insulation tubes with uniformity and with high adhesive strength.

It is another object of the present invention to provide a novel apparatus for sealing electronic or electric devices within insulation tubes with a solder in automatic operation which is suitable for mass production.

These and other objects of the invention are attained according to at least one aspect of the invention by a method of automatically sealing an electronic or electric device in an insulation tube which involves inserting the electronic or electric device in an insulation tube made of ceramic, glass or the like, and sealing an end of the insulation tube with a solder under an air-tight or vacuum atmosphere, after providing the tube with a metalized layer on its inner surface, then rotating the tube about its axis so that a molten solder is supplied on the metalized layer and distributed to peripheral parts by the centrifugal force given by the rotation of the insulation tube.

This method may be carried out by apparatus comprising a turn table carrying a plurality of insulation tube holders disposed in a circle around its central axis and which intermittently turns, a mechanism for rotating the individual insulation tube holders around their respective axes, a mechanism for stopping the rotation of a predetermined number of the holders at predetermined positions, and a mechanism for supplying a molten solder to each holder while it is rotating around its own axis, whereby the molten solder is distributed to the periphery.

In the sealing operation, the metalized layer is formed on the inner surface of an end of the insulation tube which is made of ceramic or glass, preferably by coating a silver paste thereon with a brush and calcining it, or by metal plating.

It is preferable to use a special alloy comprising main components of Pb, Sn, Zn and Sb which can be directly soldered to glass or ceramics.

Suitable solders for soldering ceramics are disclosed in U.S. Pat. No. 3,694,897, British Patent No. 1,298,030, German Patent No. 1,817,828, and French Patent No. 2,109,326.

The electronic or electric device is inserted in an insulation tube having such a metalized layer formed thereon and the insulation tube is held on the apparatus of the invention, for example, for sealing the end thereof.

BRIEF DESCRIPTION OF THE DRAWINGS

Various other objects, features and attendant advantages of this invention will be more fully appreciated as the same becomes better understood from the following detailed description, when considered in connection with the accompanying drawings wherein like reference numerals designate like or corresponding parts throughout the several views, and in which:

FIG. 1 is a front view of one embodiment of the solder sealing apparatus constructed according to this invention;

FIG. 2 is a plan view of the apparatus shown in FIG. 1;

DETAILED DESCRIPTION OF THE PREFERRED EMBODIMENT

Figure 3:
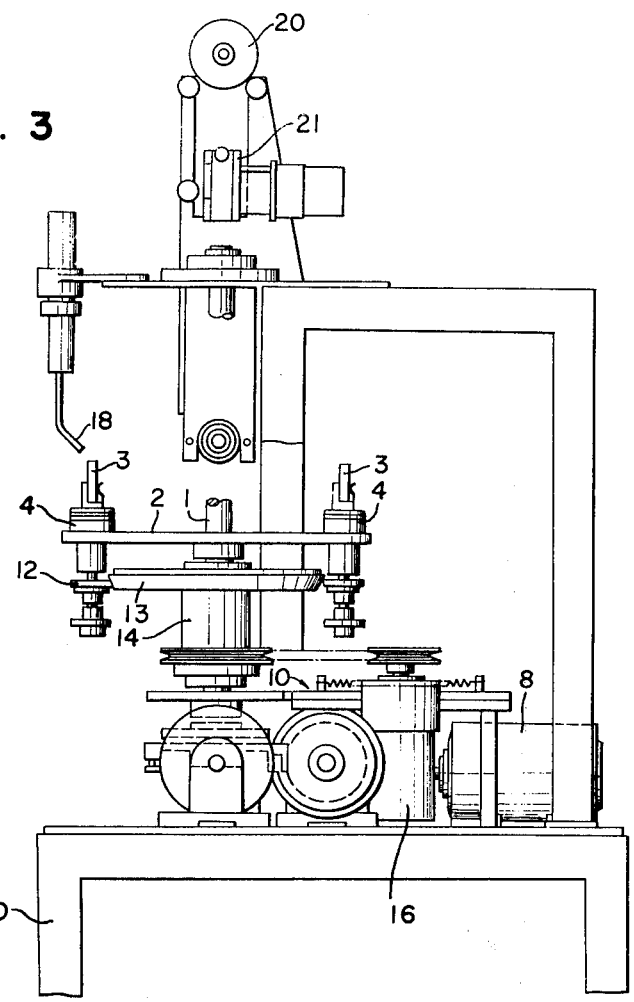
FIG. 3 is a side view of the apparatus shown in FIG. 1.

Referring now to the drawings, there is shown a vertically oriented rod 1 for rotatably supporting a circular plate, or turn table 2, from a machine bed. A plurality of insulation tubes 3 of ceramic or glass, being shown as eighteen in number are vertically arranged in a circle on the table being equi-angularly disposed thereon.

Figure 4:
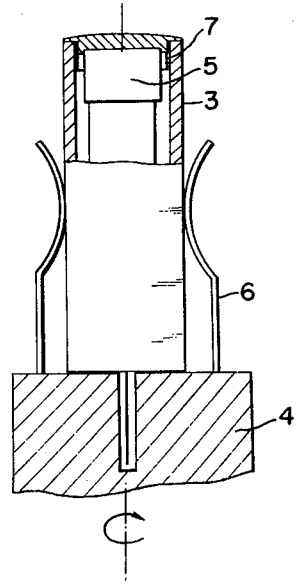
FIG. 4 is an enlarged view showing the sealing condition of the insulation tube.

As shown in FIG. 4 of a partially broken away and enlarged view, the insulation tube 3 contains a resistor 5 or the like which is inserted and held between suitable leaf springs 6 provided on each of the holders 4. As will be stated below, each of the insulation tubes 3 is sealed with a solder so as to cover a metalized layer 7 formed on the inner surface of the tube and the resistor 5.

The turn table 2 is driven by a motor 8 through a reduction gear 9 and is intermittently turned through each 1/18 of a complete revolution by the action of a stopper mechanism 10.

On the other hand, each of the insulation tube holders 4 is set on the turntable 2 so as to permit rotation thereof about its own vertical axis. Thus, the middle parts of the holders 4 are held on the turn table 2 and a flange 12 is formed on the lower part thereof projecting below the turn table, where the tube holder may be moved vertically through a coil spring 11 as will be described. A friction wheel 13 which frictionally contacts the peripheral surface of the flanges of the tube holders is mounted on a cylindrical column or rod 14 which is coaxial to the rod 1 of the turn table 2, but depends therebelow. A pulley 15 on the rod 14 is connected to a pulley of a motor 16 by a belt. Accordingly, the rotation of the motor 16 causes turning of the insulation tube holders themselves about their own vertical axes through the friction wheel 13. The mechanism for declutching the frictional contact of the flange 12 of the insulation tube holders 4 with the friction wheel 13 is a flange push-down element 17 which projects in an arcuate shape below the lower outside edge of the turn table 2 from the main bed periphery, as shown in FIGS. 1 and 2. The mechanism acts to declutch the contact of the friction wheel 13 with the respective flanges 12, and thus to interrupt rotation of the holders 4 about their own respective axes, by touching the upper part of the flange 12 of the holder 4 against the projecting push-down element 17. The mechanism thus causes interruption of the rotation of the holder A and the four additional holders in the direction of the holder B, as shown in FIG. 2.

A plurality of hot air nozzles 18, shown being four in number, for primarily heating the insulation tubes, are set at the respective axial location correspondng to the fifth to eighth holders from the holder A in the direction of holder B, again as shown in FIG. 2. From the nozzles 18, hot air having a temperature higher than the melting point of the solder, is uniformly applied to and around the metalized layer of the inner surface of the insulation tube. Each of the insulation tubes 3 held on the turn table is stopped below one of the nozzles 18 by the intermittent turning of the table 2 for several seconds and is then moved below the next nozzle, whereby the insulation tube 3 is gradually heated and rapid heating or over-heating of the metalized layer is thus prevented, as is the thermal breaking of the insulation tube itself. The temperature of the hot air being projected from the nozzle and the flow rate of the hot air is, of course, precisely controlled. The intermittent turning of the turn table 2 is constant, whereby the heating time is uniform. It is possible to impart the same effect, if desired, by using radiation heaters instead of the nozzles.

A molten solder supplying mechanism 19 is set at the axial location corresponding to the ninth holder from the holder A in the direction of holder B, as shown in FIG. 2. The mechanism comprises a linear solder winding device 20, an automatic solder feeder 21 and a solder melter-supplier 22. The automatic solder feeder 21 feeds a predetermined length of the solder from a guide tube 23 to the solder melter-supplier by a timed operation corresponding to the time when the insulation tube on the turn table 2 is stopped at a predetermined position for a predetermined time. The length of the solder being fed can be changed depending upon the thickness of the seal of the insulation tube and the sealing condition desired. The solder melter-supplier 22 is internally equipped with a heater and the top of a spatula 24 facing the soldering object is heated to a predetermined temperature. The molten solder fed from the solder feeder 21 is heated and melted to fall down around the metalized layer. As stated above, the insulation tube holder is being rotated, so that the molten solder is rapidly distributed to the wall of the tube by the centrifugal force of rotation of the tube holder around its own axis, whereby it is possible to prevent falling of the molten solder into the gap between the wall of the tube and the resistor.

In the illustrated embodiment of this invention, the rotation velocity of the holders 4 around their own axes is preferably about 320 r.p.m. and the hot air at the nozzle outlet is at a temperature of about 350° C being applied for 4 stopping periods, and the molten solder is at a temperature of about 240°-230° C and is supplied for 2 seconds, whereby complete sealing is imparted. A detector 25 is connected to a mechanism for automatically stopping the supply of molten solder to the sealing part when a tube 3 is not held in the holder 4 which is stopped at a position or is passed to a position for being sealed.

As the detector, a system for detecting a change of back pressure is utilized which includes a fluidic device. In the preferred embodiment, a fluid, such as air, is injected toward the insulation tube held in the holder, and the back pressure caused by the air-injection striking the tube is detected.

When there is no insulation tube disposed in the holder, a decrease in back pressure occurs, which is detected by the system and accordingly, a relay is actuated thereby so as to stop the supply of molten solder. It is also possible to use photocells as a detector.

Accordingly, even when a holder having no insulation tube disposed therein is stopped under the solder melter-supplier, molten solder is not supplied thereto during the time the turn table is stopped. Holders having an insulation tube to which molten solder is supplied are rotated about their axes for the intermittent turning period of the turn table 2 whereby molten solder is distributed to the wall of the tubes held therein because of centrifugal force and the rotation is maintained to permit gradual solidification. The time of the rotation is dependent upon the turning velocity of the turn table, the thickness of the solder and the rotation velocity of the holder.

In order to change the stopping position or cycle of the rotation of the holder, the length and position of the push-down element 17 may be changed.

Uniform cooling of the molten solder can be improved by the rotation of the holder about its axis, whereby sealing of the solder to the metalized layer is improved.

A mechanism 26 is provided, being shown in FIGS. 1 and 2, for removing the insulation tube from the turn table after it has been sealed with the solder. The mechanism 26 comprises an insulation tube clamp 27 at the top thereof which is vertically moved by an operation rod 28 connected to an eccentric disc 29 which makes one revolution with each revolution of the turn table 2. Thus, if the holder A stops its rotation as stated above, the clamp grips the insulation tube therein when the clamp is pushed down and releases or discharges the insulation tube by turning the top through a ninety degree angle when the clamp is raised.

In FIG. 1, the reference numeral 30 designates a yoke or bed supporting the apparatus of the invention and 31 designates a switch board. In accordance with the apparatus of this invention, molten solder is supplied to the rotating object sealing the same with the solder under a completely controlled condition, whereby uniform and strong sealing can be readily provided.

Further, in accordance with the apparatus of this invention, all of the operations of feeding and rotating the insulation tube, preheating the insulation tube, supplying the molten solder, cooling the insulation tube by rotation after supplying the molten solder thereto and removing the tube from the apparatus, can be automatically carried out whereby the overall operation is stable and precise, and productivity is thereby significantly improved.

An embodiment for sealing an insulation tube made of ceramic or glass has been illustrated. However, the invention can be also applied for sealing, under airtight or vacuum conditions, an end of a metallic tube or similar structure with a solder.

Obviously many other modifications and variations of the invention are possible in light of these teachings. It is to be understood therefore that within the scope of the appended claims the invention may be practiced otherwise than as specifically described herein.

What is claimed as new and intended to be covered by Letters Patent is:

1. An apparatus for sealing insulation tubes comprising:
   a turntable having a plurality of tube holders disposed in a circle about its central axis and means for intermittently turning said turntable through predetermined portions of a revolution so as to move said tube holders and said tubes to a plurality of working stations;
   means associated with said insulation tube holders for rotating said insulation tube holders about their respective vertical axes;
   means for stopping the rotation of a predetermined number of said holders at predetermined positions along the path of revolution of said turntable for removal of said tubes when sealed;
   means for supplying a molten solder to said holders being rotated about their axes at a predetermined position in the revolution of said turn-table whereby the molten solder is distributed to the peripheral parts of the tube for sealing said tube;
   means for heating said tubes at a plurality of predetermined positions along the path of revolution of said turntable so as to intermittently, yet gradually heat said tubes prior to said sealing of said tubes; and
   said means for rotating said tube holders comprises a friction wheel co-axially disposed with respect to said turntable which contacts said tube holders below the surface of said turntable, said tube holders being disposed about the periphery of said friction wheel so as to be simultaneously driven thereby.

2. The apparatus according to claim 1, wherein said means for heating said tubes comprises a plurality of sources of hot air set at predetermined positions above the turn table in advance of the position along the path of revolution thereof where said means for supplying molten solder is disposed.

3. The apparatus according to claim 1, wherein said means for stopping the rotation of said tube holders comprises a mechanism for disengaging said contact of said tube holders and said friction wheel.

4. The apparatus according to claim 3, wherein:
   said tube holders are spring-biased upwardly to first positions with respect to said turntable and said friction wheel so as to be engaged with said friction wheel; and
   said mechanism is movable vertically downwardly against the biasing force of said springs so as to move said predetermined tube holders to second positions with respect to said turntable and said friction wheel in order to disengage said tube holders from said friction wheel.

* * * * *